(12) United States Patent
Seo et al.

(10) Patent No.: US 8,349,488 B2
(45) Date of Patent: *Jan. 8, 2013

(54) SECONDARY BATTERY INCLUDING A PROTECTIVE CIRCUIT BOARD MADE OF METAL

(75) Inventors: Kyungwon Seo, Yongin-si (KR); Youngcheol Jang, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 447 days.

This patent is subject to a terminal disclaimer.

(21) Appl. No.: 12/628,938

(22) Filed: Dec. 1, 2009

(65) Prior Publication Data

US 2010/0136423 A1 Jun. 3, 2010

(30) Foreign Application Priority Data

Dec. 3, 2008 (KR) .................. 10-2008-0121878

(51) Int. Cl.
*H01M 2/02* (2006.01)
*H01M 2/08* (2006.01)
*H01M 2/04* (2006.01)

(52) U.S. Cl. ................ 429/181; 429/175; 429/185

(58) Field of Classification Search .............. 429/100, 429/164, 181, 185, 122, 59, 177; 174/526; 257/787
See application file for complete search history.

(56) References Cited

U.S. PATENT DOCUMENTS

| | | | |
|---|---|---|---|
| 4,920,019 A * | 4/1990 | Stoklosa et al. ............ 429/122 |
| 5,610,442 A | 3/1997 | Schneider et al. | |
| 5,796,038 A | 8/1998 | Manteghi | |
| 2004/0115519 A1 | 6/2004 | Lee | |
| 2004/0115521 A1 | 6/2004 | Cho | |
| 2005/0153195 A1* | 7/2005 | Han ............................ 429/59 |
| 2005/0214597 A1 | 9/2005 | Kim et al. | |
| 2006/0019160 A1* | 1/2006 | Han ........................... 429/185 |
| 2006/0083982 A1* | 4/2006 | Jung et al. .................. 429/164 |
| 2006/0263648 A1 | 11/2006 | Park et al. | |
| 2007/0287063 A1* | 12/2007 | Hiratsuka et al. ........... 429/177 |
| 2008/0152994 A1* | 6/2008 | Yamagami et al. ......... 429/100 |
| 2008/0226980 A1 | 9/2008 | Kim | |
| 2009/0098418 A1 | 4/2009 | Byun et al. | |

FOREIGN PATENT DOCUMENTS

| | | |
|---|---|---|
| CN | 1495933 A | 5/2004 |
| CN | 2862343 Y | 1/2007 |
| EP | 1 926 160 A1 | 5/2008 |
| EP | 1 970 722 A2 | 9/2008 |
| JP | 64-044356 | 2/1989 |

(Continued)

OTHER PUBLICATIONS

Machine Translation of: JP 2004071346 A, Senda et al., Mar. 2004.*

(Continued)

*Primary Examiner* — Jonathan Crepeau
*Assistant Examiner* — Kenneth Douyette
(74) *Attorney, Agent, or Firm* — Christie, Parker & Hale, LLP (57) ABSTRACT

A secondary battery has a bare cell including a can, an electrode assembly in the can and a cap assembly sealing the can. A protective circuit module is on the bare cell, the protective circuit module including a metal protective circuit board.

12 Claims, 4 Drawing Sheets

FOREIGN PATENT DOCUMENTS

| | | |
|---|---|---|
| JP | 08-031460 | 2/1996 |
| JP | 11-026029 | 1/1999 |
| JP | 2004-071346 | 3/2004 |
| JP | 2004-221024 | 8/2004 |
| JP | 2006-012823 | 1/2006 |
| JP | 2007-234586 | 9/2007 |
| JP | 2008-181855 | 8/2008 |
| KR | 10-2002-0070653 | 9/2002 |
| KR | 10-2005-0082424 | 8/2005 |
| KR | 10-2006-0112728 | 11/2006 |
| KR | 10-2008-0032912 | 4/2008 |
| KR | 10-0851963 B1 | 8/2008 |
| KR | 10-2008-0084237 A | 9/2008 |

OTHER PUBLICATIONS

Greenhalgh et al., "Strength of epoxy-resin-based insulation systems in transverse tension and shear using two novel test pieces", International Journal of Adhesion and Adhesives, vol. 23, Issue 6, p. 485-494, 2003.*

European Search Report dated Mar. 2, 2010, for corresponding European Patent application 09177922.3, noting listed references in this IDS.

Chinese Office action dated Jan. 18, 2012 issued to corresponding Chinese patent application No. 2009-10224-4363.2, citing the listed references in this IDS, 4 pages.

English translation of Chinese Office action dated Jan. 18, 2012 cited above, 7 pages.

Patent Abstracts of Japan, and English machine translation of Japanese Publication 2008-181855, listed above, 21 pages.

Patent Abstracts of Japan, and English machine translation of Japanese Publication 08-031460, listed above, 9 pages.

Japanese Office action dated Jun. 26, 2012, for corresponding Japanese Patent application 2009-219194, (2 pages).

Patent Abstracts of Japan, and English machine translation of Japanese Publication 11-026029 listed above (11 pages).

Patent Abstracts of Japan, and English machine translation of Japanese Publication 2004-221024 listed above (8 pages).

* cited by examiner

SECONDARY BATTERY INCLUDING A PROTECTIVE CIRCUIT BOARD MADE OF METAL

CROSS-REFERENCE TO RELATED PATENT APPLICATION

This application claims priority to and the benefit of Korean Patent Application No. 10-2008-0121878 filed on Dec. 3, 2008, in the Korean Intellectual Property Office (KIPO), the entire content of which is hereby incorporated by reference.

BACKGROUND OF THE INVENTION

1. Field of the Invention

The present invention relates to a secondary battery.

2. Description of the Related Art

A lithium ion secondary battery may include a core pack composed of a bare cell and a protective circuit module.

The bare cell, generally composed of a positive electrode plate, a negative electrode plate, an electrolyte and a separator, serves as a power source for external electronic equipment and is capable of repeated use after recharging thereof. The protective circuit module protects the secondary battery against overcharge and overcurrent and prevents performance deterioration of the battery that may occur due to excessive discharge.

SUMMARY OF THE INVENTION

In accordance with embodiments of the present invention, a secondary battery is provided capable of achieving an improved production yield through reduction of production processes and costs and a smaller structure.

The problems to be solved by the present invention are not limited to the technical problems as mentioned above, but include other technical problems not mentioned herein which would be apparent from the following description by a person having ordinary knowledge in the art to which the invention pertains.

In one embodiment, a secondary battery has a bare cell including a can, an electrode assembly within the can and a cap assembly sealing the can. A protective circuit module is on the bare cell, the protective circuit module including a metal protective circuit board. The cap assembly may include a cap plate having a first terminal hole, an electrode terminal within the first terminal hole, and a gasket between the electrode terminal and the cap plate. The protective circuit module may include an insulating layer on the protective circuit board and a charge/discharge terminal, and a protective circuit part on the insulating layer. The protective circuit board may be on the cap plate, made from aluminum and may have two peripheral ends, each peripheral end being attached to a peripheral end of the cap plate.

In one embodiment, the protective circuit board includes a second terminal hole configured to receive the electrode terminal and the gasket. Further, the gasket may contact a wall defined by the second terminal hole and the electrode terminal may be spaced from the second terminal hole.

The secondary battery may further include a negative electrode lead plate electrically connected to the electrode terminal on the insulating layer, wherein the insulating layer may be an epoxy insulating layer.

BRIEF DESCRIPTION OF THE DRAWINGS

In one embodiment, the protective circuit board may include a plurality of protrusions and the cap plate may include a plurality of coupling holes, wherein each of the plurality of protrusions is configured to be inserted into one of the plurality of coupling holes. The protrusions and the coupling holes may be coupled, for example, by an interference fit.

DETAILED DESCRIPTION OF THE PREFERRED EMBODIMENTS

Embodiments of the present invention will be described in more detail with reference to accompanying drawings such that those skilled in the art can easily practice the present invention. These and other objects, advantages and features of the present invention and methods of achieving the same will become apparent from the detailed embodiments given below which are made in conjunction with the following drawings. Like numbers refer to like elements throughout the specification and drawings.

Hereinafter, secondary batteries in accordance with various embodiments of the present invention will be described in more detail with reference to the accompanying drawings.

Figure 1:
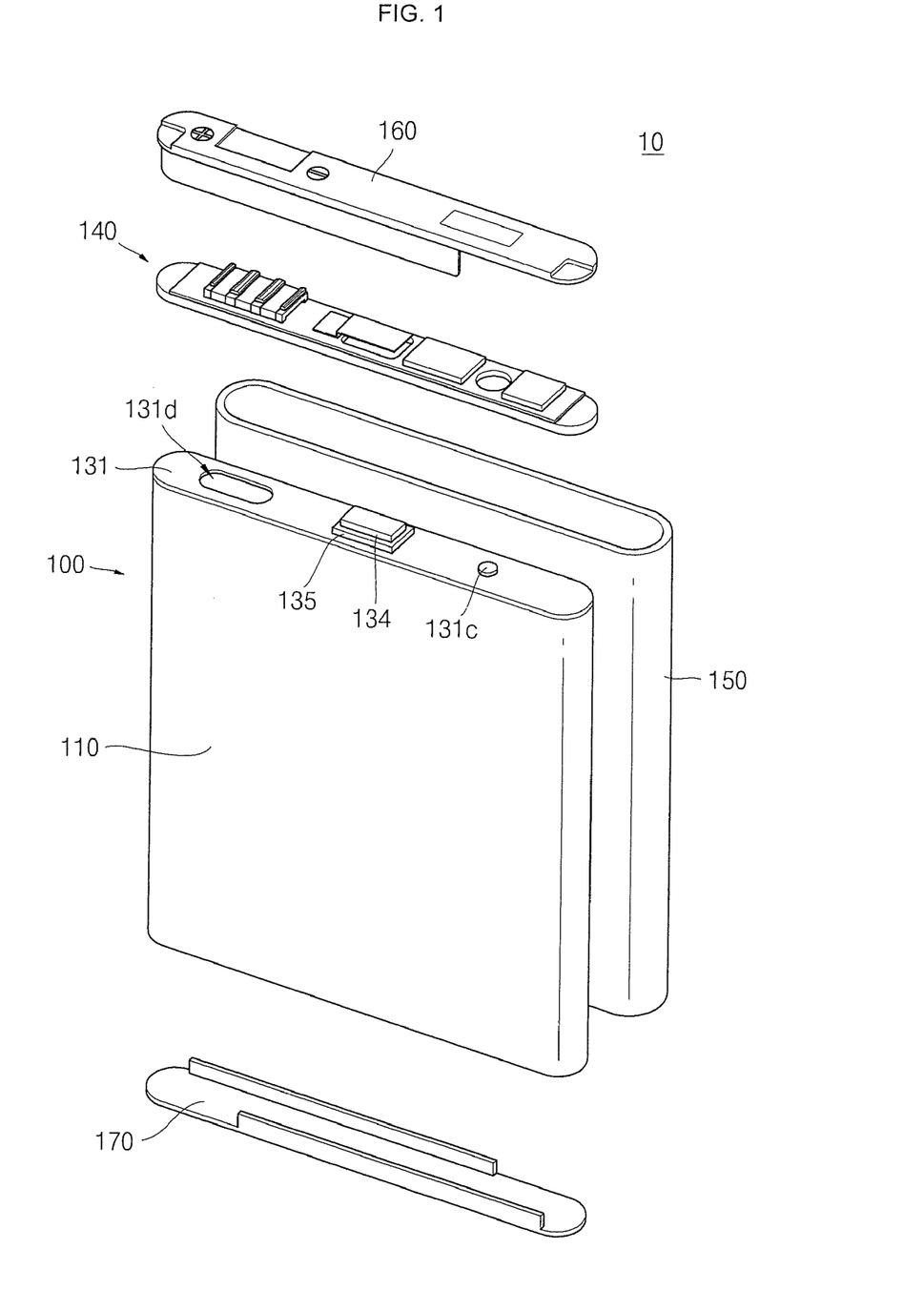
FIG. 1 is an exploded perspective view of a secondary battery in accordance with an embodiment of the present invention.
Figure 2:
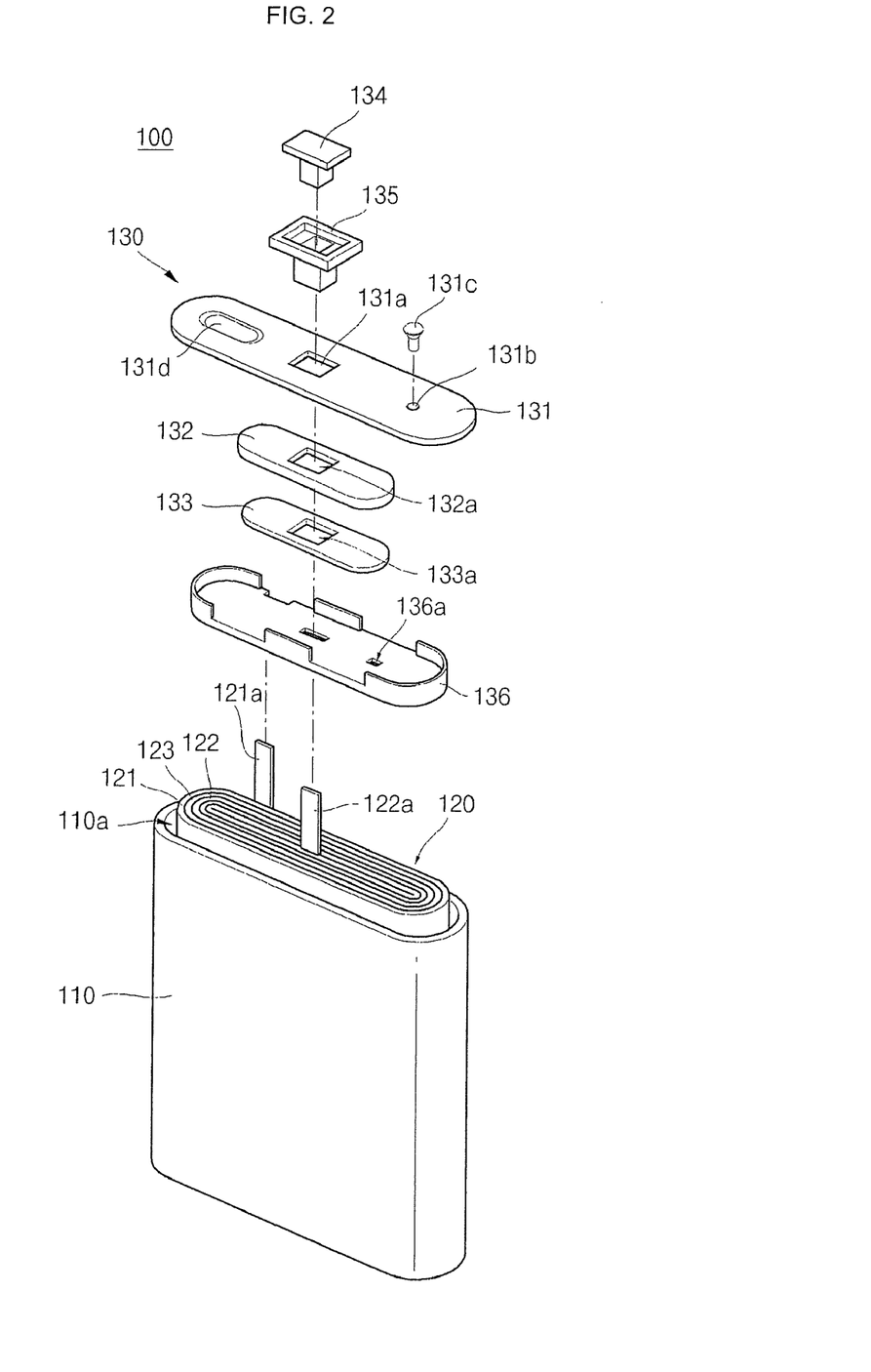
FIG. 2 is an exploded perspective view of a bare cell of the secondary battery of FIG. 1 in accordance with an embodiment of the present invention.

FIG. 1 is an exploded perspective view of a secondary battery 10 in accordance with an embodiment of the present invention, and FIG. 2 is an exploded perspective view of a bare cell 100 of the secondary battery 10 in accordance with an embodiment of the present invention.

Referring to FIG. 1, the secondary battery 10 includes a bare cell 100, a protective circuit module 140, a label 150, an upper case 160 and a lower case 170. The protective circuit module 140 is positioned on the bare cell 100, and the protective circuit module and the bare cell may be in electrical and mechanical connection with each other. An outer surface of the bare cell 100 may be protected by being wrapped by a label 150. The upper case 160 may be positioned to encase the protective circuit module 140 and an upper part of the bare cell 100, and the lower case 170 may be positioned to encase a lower part of the bare cell 100.

Referring to FIG. 2 in conjunction with FIG. 1, the bare cell 100 may include a can 110, an electrode assembly 120 housed in the can 110, and a cap assembly 130 covering an open upper part 110a of the can 110.

The can 110 may be of a generally rectangular shape having rounded edges and an open upper part 110a at one side thereof. The can 110 may be formed of a metal and may also serve as a terminal. An electrode assembly 120 which will be illustrated hereinafter can be inserted into the can 110 through the open upper part 110a.

The electrode assembly 120 may include a first electrode plate 121, a second electrode plate 122 and a separator 123. Further, the electrode assembly 120 is fabricated by stacking the first electrode plate 121, the second electrode plate 122 and the separator 123 between the first and second electrode plates, and winding the resulting stacked structure into a jelly roll shape.

The first electrode plate 121 may be composed of a first electrode collector and a first electrode coating portion.

The first electrode collector may be formed of aluminum (Al) foil having excellent conductivity, when the first electrode plate 121 is a positive electrode.

The first electrode coating portion is positioned on the first electrode collector and may be composed of a first electrode active material, a conductive material and a binder. Nonlimiting examples of the first electrode active material may include lithium cobalt oxide ($LiCoO_2$), lithium manganese oxide ($LiMn_2O_4$), lithium nickel oxide ($LiNiO_2$), and the like. The conductive material may be carbon black or the like. As the binder, Polyvinylidene Fluoride (PVDF), Styrene-Butadiene-Rubber (SBR) or poly(tetrafluoroethylene) (PTFE) may be used in the form of a solution or dispersion thereof in a volatile solvent (such as N-Methylpyrrolidone (NMP)), in an organic solvent or in water.

Both ends of the first electrode collector may be provided with first electrode non-coating portions that are not coated by electrode active material. A first electrode tab 121a is attached to the first electrode non-coating portion and protrudes toward the open upper part 110a of the can 110. The first electrode tab 121a may be formed of aluminum or the like. In order to prevent a possible short circuit with parts other than the can 110, a first insulating tape may be provided on a portion where the first electrode tab 121a is drawn from the electrode assembly 120.

The second electrode plate 122 may be composed of a second electrode collector (not shown) and a second electrode coating portion (not shown).

The second electrode collector may be formed of copper (Cu) foil having excellent conductivity, when the second electrode plate 122 is a negative electrode.

The second electrode coating portion is positioned on the second electrode collector, and may be composed of a second electrode active material, a conductive material and a binder. Nonlimiting examples of materials for the second electrode active material may include carbon (C)-based materials, Si, Sn, tin oxides, composite tin alloys, transition metal oxides, lithium metal nitrides, lithium metal oxides, and the like. Typically, carbon (C)-based materials may be used for the second electrode active material. Examples of the conductive materials may include carbon black, and the like. As the binder, PVDF, SBR or PTFE may be used by dissolving or dispersing it in a volatile solvent (such as NMP), in an organic solvent or in water. The second electrode plate 122 does not necessarily need to include a conductive material due to high conductivity of the second electrode active material.

Both ends of the second electrode collector may be provided with second electrode non-coating portions that are not coated with an electrode active material. A second electrode tab 122a is attached to the second electrode non-coating portion and protrudes toward the open upper part 110a of the can 110. The second electrode tab 122a may be formed of copper (Cu) or nickel (Ni). In order to prevent a possible short circuit with parts other than an electrode terminal 134, a second insulating tape may be provided on a portion where the second electrode tab 122a is drawn from the electrode assembly 120.

Although the above-mentioned configuration is illustrated with reference to a structure where the first electrode plate 121 is a positive electrode and the second electrode plate 122 is a negative electrode, it is possible for the first electrode plate 121 to be a negative electrode and the second electrode plate 122 to be a positive electrode. In this case, materials for current collectors and coating portions may be interchanged.

Generally in a square-type secondary battery 10, the can 110 serving as a terminal may be a positive electrode. If the first electrode plate 121 is a positive electrode, the outermost electrode plate of a jelly-roll electrode assembly 120 may be the first electrode plate 121 which corresponds to the positive electrode. If the first electrode plate 121 is a negative electrode, the outermost electrode plate of a jelly-roll electrode assembly 120 may be the second electrode plate 122 which corresponds to the positive electrode.

Hereinafter, an embodiment will be illustrated wherein the first electrode plate 121 is a positive electrode and the second electrode plate 122 is a negative electrode.

The separator 123 may be formed of a porous film using polyethylene (PE), polypropylene (PP) or a composite film thereof. The separator 123 serves to block electron conduction between the first electrode plate 121 and the second electrode plate 122 that may take place in the electrode assembly 120, and facilitates smooth migration of lithium ions. The separator 123 may prevent possible contact between the first electrode plate 121 and the second electrode plate 122 and may also prevent a rise of battery temperatures through the shut-down function or the like, upon elevation of an internal temperature of the secondary battery 10 due to an external short circuit or the like.

In order to prevent a short circuit between the first electrode plate 121 and the second electrode plate 122, either or both surfaces of the first electrode plate 121 and the second electrode plate 122 may be further provided with a ceramic layer of a ceramic/binder mixture in addition to installation of the separator 123.

In the electrode assembly 120, upon charging of the fabricated battery, lithium ions migrate into the second electrode plate 122 from the first electrode plate 121 (intercalation). In contrast, upon discharging, lithium ions migrate into the first electrode plate 121 from the second electrode plate 122 (deintercalation). As a result, a voltage can be applied to external equipment via such a repeated intercalation/deintercalation process of lithium ions from the first electrode plate 121 to the second electrode plate 122 or vice versa.

The cap assembly 130 may include a cap plate 131, an insulating plate 132, a terminal plate 133, an electrode terminal 134, and a gasket 135. The cap assembly 130, in conjunction with a separate insulating case 136, is combined into the electrode assembly 120 at the open upper part 110a of the can 110, thus resulting in hermetic sealing of the can 110. The insulating case 136 may be provided with a hole 136a for injection of an electrolyte into the electrode assembly 120.

The cap plate 131 may be formed of a metal plate having a size generally corresponding to the open part 110a of the can 110. The center of the cap plate 131 may be provided with a first hole 131a having a given size. In the context of the present invention, the hole formed at the center of the cap plate 131 will be defined as a first terminal hole 131a. One side of the cap plate 131 may be provided with an electrolyte injection hole 131b. After injection of an electrolyte into the can 110 is complete, the electrolyte injection hole 131b may be sealed with a plug 131c such as a ball. In the context of the present invention, the electrolyte injection hole 131b and the plug 131c may be referred to as an electrolyte injection part. On one side of the cap plate 131 opposite to the electrolyte injection hole 131b with respect to the first terminal hole 131a, there may be provided a safety vent 131d. The safety vent 131d may have a step configuration with respect to the surrounding portion of the cap plate 131 due to formation of a groove on one surface of the cap plate 131. The safety vent 131*d* may be ruptured to result in external discharge of gases upon occurrence of high internal pressure in the bare cell 100. The cap plate 131 may be contacted in electrical connection with the first electrode tab 121*a*. Therefore, the cap plate 131 may have the same polarity as the first electrode plate 121.

The insulating plate 132 is plate-like and may be positioned below and/or adjacent the cap plate 131. The insulating plate 132 may have a second hole 132*a* at the position generally corresponding to the first terminal hole 131*a*. The insulating plate 132 may be formed of the same insulating material as the gasket 135.

The terminal plate 133 is plate-like and may be positioned below and/or adjacent the insulating plate 132. The terminal plate 133 may have a third hole 133*a* at the position generally corresponding to the second hole 132*a*. The terminal plate 133 may be formed of nickel or nickel alloy.

The electrode terminal 134 can be inserted into the cap plate 131, the insulating plate 132 and the terminal plate 133 through the first hole 131*a*, the second hole 132*a* and the third hole 133*a*. The electrode terminal 134 may be electrically connected to the second electrode tab 122*a*. Therefore, the electrode terminal 134 may have the same polarity as the second electrode plate 122.

The gasket 135 may be positioned between the electrode terminal 134 and the cap plate 131 to provide insulation between the electrode terminal 134 and the cap plate 131, when the electrode terminal 134 is inserted into the first terminal hole 131*a* of the cap plate 131.

The protective circuit module 140 may be positioned on an upper surface of the bare cell 100 to thereby provide protection of the secondary battery 10 against overcharge and overcurrent and to prevent performance deterioration of the battery that may occur due to overdischarge. Hereinafter, a connection structure between the protective circuit module 140 and the bare cell 100 will be illustrated in more detail with reference to FIGS. 3 and 4.

Figure 3:
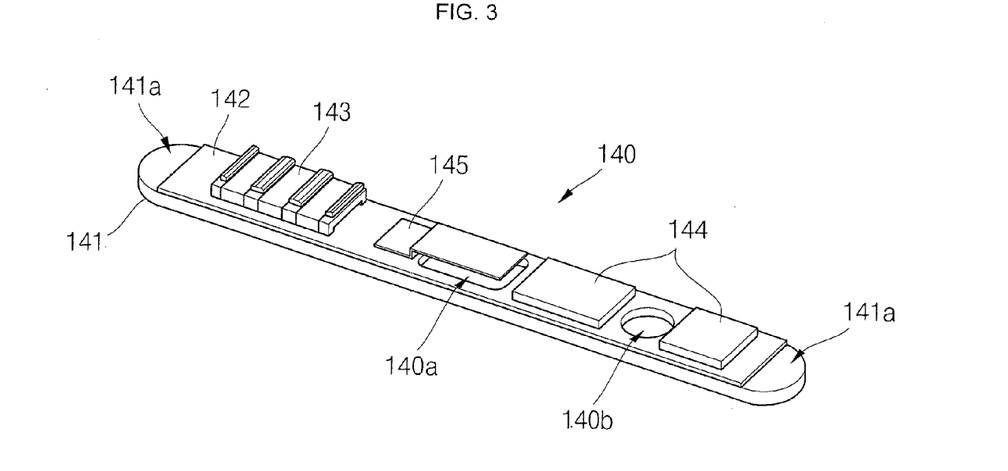
FIG. 3 is a perspective view of a protective circuit module in accordance with an embodiment of the present invention.
Figure 4:
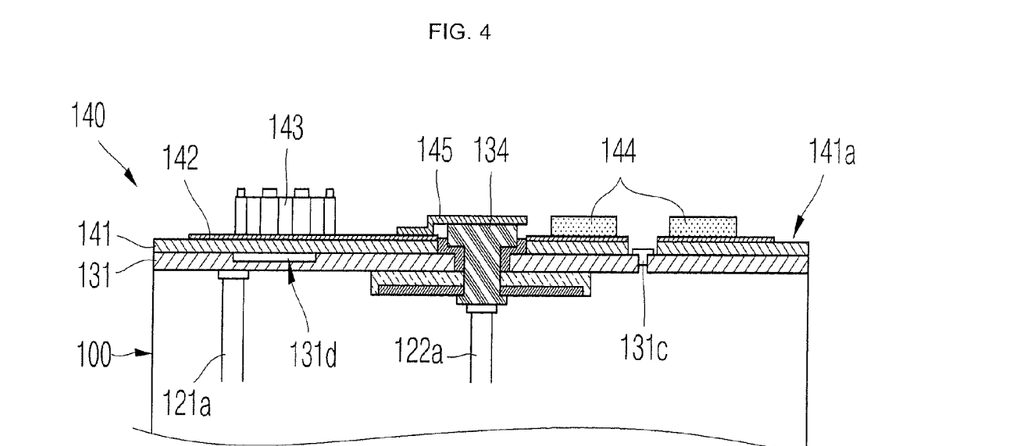
FIG. 4 is a cross-sectional view of a portion of a secondary battery in accordance with an embodiment of the present invention.

FIG. 3 is a perspective view of a protective circuit module 140 in accordance with an embodiment of the present invention and FIG. 4 is a cross-sectional view of a portion of a secondary battery 10 in accordance with an embodiment of the present invention.

Referring to FIGS. 3 and 4, the protective circuit module 140 may include a protective circuit board 141, an insulating layer 142, a charge/discharge terminal 143, a protective circuit part 144 and a negative electrode lead plate 145.

The protective circuit board 141 may have a plate-like structure generally corresponding to a cap plate 131. The protective circuit board 141 may be formed of a metal, for example, aluminum (Al). The protective circuit board 141 is in face-to-face contact with the cap plate 131 to result in electrical connection therebetween, and may have the same polarity as the first electrode plate 121. The protective circuit board 141 will be described in more detail hereinafter.

The insulating layer 142 may be positioned on the protective circuit board 141. The insulating layer 142 may have a plate-like structure generally conforming to the protective circuit board 141. The insulating layer 142 may be provided with a conductive metal pattern for electrical connection between the protective circuit board 141, the charge/discharge terminal 143, the protective circuit part 144 and the negative electrode lead plate 145. There is no particular limit to materials for the insulating layer 142, as long as they serve as an insulating material. In one embodiment, an epoxy resin may be employed as the material of the insulating layer 142. A second terminal hole 140*a* may be formed at the position corresponding to the electrode terminal 134 and gasket 135 in the protective circuit board 141 and insulating layer 142. The electrode terminal 134 and the gasket 135 can be inserted into the second terminal hole 140*a*. Further, in the protective circuit board 141 and insulating layer 142, an injection hole 140*b* may be formed at the position corresponding to the electrolyte injection part of the cap plate 131.

The charge/discharge terminal 143 is electrically connected to the protective circuit board 141, the protective circuit part 144, the negative electrode lead plate 145 and the conductive metal pattern, and can serve as an electrical path for communication with external electronic equipment.

In the protective circuit part 144, passive and active elements including a protective circuit may be electrically connected to the conductive metal pattern. The protective circuit can protect the battery by checking information such as charging/discharging state, current, voltage, and temperature of the battery.

The negative electrode lead plate 145 is positioned on the insulating layer 142, and may be in electrical connection with the electrode terminal 134. The negative electrode lead plate 145 may be composed of a portion soldered to the insulating layer 142, a portion welded to the electrode terminal 134, and a portion connecting the soldering portion and the welding portion.

The protective circuit board 141 may be placed in face-to-face contact with an upper surface of the bare cell 100, more specifically in contact with an upper surface of the cap plate 131. The protective circuit board 141 is formed of a metal and is in face-to-face contact with the cap plate 131 to result in electrical connection therebetween, so the protective circuit board 141 also has a positive polarity. In the protective circuit board 141, both opposite sides or ends 141*a* absent the insulating layer 142 can be electrically and mechanically connected with sufficient strength to the cap plate 131 by laser welding each end with opposite sides or ends of the cap plate 131.

As illustrated above, the gasket 135 and electrode terminal 134 of the bare cell 100 are inserted into the second terminal hole 140*a* of the protective circuit module 140. An injection hole 140*b* may be formed in the protective circuit module 140 generally corresponding to the electrolyte injection part of the bare cell 100. Therefore, the protective circuit board 141 can be disposed on the cap plate 131 without twisting and inclination.

In this connection, the electrode terminal 134 may be spaced from the protective circuit board 141, and more specifically the electrode terminal 134 may be spaced from an inner wall defining the second terminal hole 140*a*. Since the electrode terminal 134 exhibits a negative polarity, the electrode terminal 134 should be spaced from an inner wall defining the second terminal hole 140*a* in order to avoid possible contact between the protective circuit board 141 and the electrode terminal 134. For this purpose, the gasket 135 is disposed in contact with the inner wall defining the second terminal hole 140*a*, so it is possible to achieve a structure where the electrode terminal 134 is spaced from the protective circuit board 141.

In a conventional secondary battery 10, the protective circuit module 140 is made of nonmetal, and a separate positive electrode lead plate (or tab) is included for connection of the cap plate 131 of the bare cell 100 to the protective circuit module 140. With formation of a space between the protective circuit module 140 and the bare cell 100, the positive electrode lead plate may be soldered or welded to the protective circuit board 141 and the bare cell 100. Therefore, an unnecessary space is formed for electrical connection between the bare cell 100 and the protective circuit module 140, and such a space may be an obstacle to reducing or minimizing a size of the secondary battery 10.

In the secondary battery 10 in accordance with an embodiment of the present invention, the protective circuit board 141 is made of a metal and therefore can serve as a positive electrode lead plate. Since the protective circuit board 141 is disposed in face-to-face contact with the cap plate 131 to result in electrical connection therebetween, there is no formation of a space between the bare cell 100 and the protective circuit module 140. As a consequence, a slimmer and more compact secondary battery 10 can be fabricated through removal of the undesirable space that may be formed between the bare cell 100 and the protective circuit module 140 because of the positive electrode lead plate.

Further, it is possible to secure a price competitiveness and good production yield of the secondary battery 10, because of elimination of production costs of a conventional positive electrode lead plate, and the elimination of additional processes and costs of soldering and welding for connection of the positive electrode lead plate to the bare cell 100 and the protective circuit module 140.

Further, because the protective circuit board 141, serving as a main board of the protective circuit module 140, is made of metal, strength of the protective circuit module 140 and the secondary battery 10 can be enhanced.

Figure 5:
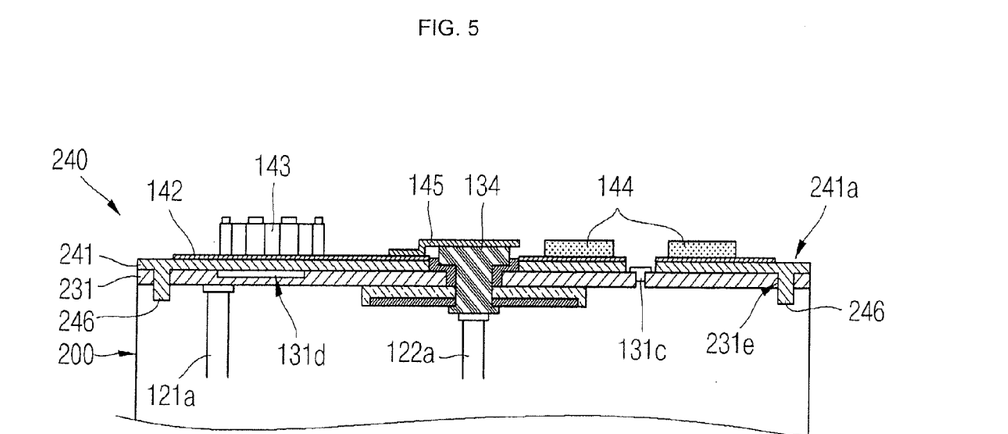
FIG. 5 is a cross-sectional view of a portion of a secondary battery in accordance with another embodiment of the present invention.

FIG. 5 is a cross-sectional view of a secondary battery 20 in accordance with another embodiment of the present invention. Hereinafter, differences between the embodiment of FIG. 5 and the embodiments of FIGS. 1 to 4 will be mainly illustrated.

Referring to FIG. 5, the secondary battery 20 may include a bare cell 200 and a protective circuit module 240.

The protective circuit module 240 may include a protective circuit board 241, an insulating layer 142, a charge/discharge terminal 143, a protective circuit part 144 and a negative electrode lead plate 145. Both peripheries 241a of a lower surface of the protective circuit board 241 may include protrusions 246. The protrusions 246 may have a cylindrical or hexahedral shape. The protrusions 246 may be cast integrally to be a single piece with the protective circuit board 241, or otherwise may be welded to the lower surface of the protective circuit board 241. Alternatively, the protrusions 246 may be formed by pressing certain portions of the protective circuit board 241 where the protrusions 246 will be formed. In the present embodiment, a structure of the protrusions 246 will be illustrated which are formed by integral casting with the protective circuit board 241.

In a cap plate 231 of the bare cell 200, the positions generally corresponding to the protrusions 246 may be provided with coupling holes 231e corresponding to the protrusions.

The protective circuit board 241 can be disposed in face-to-face contact with an upper surface of the bare cell 200, and more specifically with an upper surface of the cap plate 231. The protective circuit board 241 is formed of metal and is in electrical connection with the cap plate 231 in a face-to-face contact manner, so the protective circuit board 241 also has a positive polarity. In this connection, the protective circuit board 241 is in face-to-face contact with the cap plate 231 to result in electrical connection therebetween, so there is no formation of a space between the bare cell 200 and the protective circuit module 240. As a consequence, a slim and compact secondary battery 20 can be fabricated through omission of an undesirable space between the bare cell 200 and the protective circuit module 240.

Further, it is possible to secure a price competitiveness and good production yield of the secondary battery 20 due to elimination of production costs of a conventional positive electrode lead plate, and elimination of additional soldering and welding processes and costs for connection of the positive electrode lead plate to the bare cell 200 and the protective circuit module 240. Further, because the protective circuit board 241, serving as a main board of the protective circuit module 240, is made of metal, strength of the protective circuit module 240 and the secondary battery 20 can be further enhanced.

The protrusions 246 may be engaged into the coupling holes 231e by an interference fit. The interference fit refers to a hole-shaft engagement absent a gap between the shaft and a wall defined by the hole when a shaft is inserted into the hole. The protective circuit board 241 and the cap plate 231 can be sufficiently electrically and mechanically connected to each other by interference fit of the protrusions 246 and the coupling holes 231e. A conductive adhesive may be further applied between the protrusions 246 and the coupling holes 231e to further strengthen electrical and mechanical connection and coupling therebetween.

As apparent from the above description, a secondary battery in accordance with embodiments of the present invention is fabricated with provision of a protective circuit board made of a metal and directly connected to a bare cell, whereby a space between the protective circuit module and the bare cell formed due to installation of a conventional lead plate is eliminated to thereby reduce or minimize a size of the secondary battery.

Further, production costs and processes of the secondary battery can be decreased through curtailment of production costs of the conventional lead plate and reduction of soldering and welding processes for connection of tabs.

Further, a strength of the secondary battery can be enhanced through use of a metal substrate in the protective circuit module.

Although embodiments of the present invention have been described with reference to the attached drawings, those skilled in the art will appreciate that various modifications, additions and substitutions are possible, without departing from the scope and spirit of the invention as disclosed in the accompanying claims. It should be understood that the embodiments and the accompanying drawings have been disclosed for illustrative purposes only and the present invention is limited only by the following claims. Furthermore, it is to be understood that various modifications, additions and substitutions that can be derived from the equivalent concepts of the accompanying claims and drawings fall within the scope of the present invention.

What is claimed is:

1. A secondary battery comprising:
    a bare cell comprising a can, an electrode assembly within the can, and a cap assembly comprising a cap plate sealing the can; and
    a protective circuit module on the bare cell, wherein the protective circuit module comprises a protective circuit board made of metal, the protective circuit board including a first surface electrically connected to and in face-to-face contact with the cap plate, the protective circuit module further comprising a protective circuit part on a second surface of the protective circuit board that is opposite the first surface.

2. The secondary battery according to claim 1, wherein the cap assembly comprises:
    the cap plate having a first terminal hole;
    an electrode terminal in the first terminal hole; and
    a gasket between the electrode terminal and the cap plate, wherein the protective circuit module comprises:
    an insulating layer on the second surface of the protective circuit board; and
    a charge/discharge terminal and the protective circuit part on the insulating layer.

3. The secondary battery according to claim 2, wherein the protective circuit board has a second terminal hole configured to receive the electrode terminal and the gasket.

4. The secondary battery according to claim 2, wherein the protective circuit board has a plate-like structure substantially corresponding to the cap plate.

5. The secondary battery according to claim 3, wherein the gasket contacts a wall defined by the second terminal hole.

6. The secondary battery according to claim 3, wherein the electrode terminal is spaced from an inner side of the second terminal hole.

7. The secondary battery according to claim 2, wherein a negative electrode lead plate electrically connected to the electrode terminal is on the insulating layer.

8. The secondary battery according to claim 2, wherein the protective circuit board has two peripheral ends, each peripheral end being attached to a corresponding peripheral end of the cap plate.

9. The secondary battery according to claim 1, wherein the protective circuit board is formed of aluminum.

10. The secondary battery according to claim 2, wherein the insulating layer comprises epoxy.

11. The secondary battery according to claim 1,
    the protective circuit board comprising a plurality of protrusions and the cap plate having a plurality of coupling holes, wherein each of the plurality of protrusions is configured to be inserted into one of the plurality of coupling holes.

12. The secondary battery according to claim 11, wherein the protrusions and the coupling holes are coupled by an interference fit.

* * * * *